United States Patent

McCorkle et al.

[11] Patent Number: 5,738,477
[45] Date of Patent: Apr. 14, 1998

[54] PANEL SNAP FASTENER ASSEMBLY

[75] Inventors: Daniel J. McCorkle, Irvine; Robert L. Waits, Riverside; Heinrich Rehburg, Orange, all of Calif.

[73] Assignee: Shur-Lok Corporation, Irvine, Calif.

[21] Appl. No.: 815,965

[22] Filed: Mar. 13, 1997

Related U.S. Application Data

[63] Continuation of Ser. No. 422,351, Apr. 14, 1995, Pat. No. 5,613,818.

[51] Int. Cl.⁶ ........................................ A61B 19/00
[52] U.S. Cl. ........................................ 411/509; 411/970
[58] Field of Search ........................ 411/179, 177, 411/180, 182, 352, 353, 508, 509, 517, 970

[56] References Cited

U.S. PATENT DOCUMENTS

| | | |
|---|---|---|
| 2,327,605 | 8/1943 | Ryder . |
| 2,336,153 | 12/1943 | Ryder . |
| 3,369,653 | 2/1968 | Edwards .................. 411/509 X |
| 3,417,439 | 12/1968 | Seckerson .................. 24/73 |
| 3,628,816 | 12/1971 | Ross, Jr. . |
| 3,659,320 | 5/1972 | Meyers .................. 411/509 X |
| 3,871,430 | 3/1975 | Meyer .................. 411/970 X |
| 3,967,432 | 7/1976 | Starr .................. 411/970 X |
| 3,988,808 | 11/1976 | Poe et al. .................. 24/73 P |
| 4,750,878 | 6/1988 | Nix et al. .................. 411/509 X |
| 5,026,233 | 6/1991 | Carothers .................. 411/177 |
| 5,094,579 | 3/1992 | Johnson .................. 411/970 X |
| 5,244,325 | 9/1993 | Knohl .................. 411/970 X |
| 5,288,189 | 2/1994 | Hepworth .................. 411/32 |
| 5,328,311 | 7/1994 | Knohl .................. 411/353 |
| 5,613,818 | 3/1997 | McCorkle et al. .................. 411/509 |

FOREIGN PATENT DOCUMENTS

| | | |
|---|---|---|
| 2572144 | 4/1986 | France . |
| 3212160 | 10/1983 | Germany . |

*Primary Examiner*—Suzanne Dino Barrett
*Attorney, Agent, or Firm*—Price, Gess & Ubell

[57] ABSTRACT

A snap fastener assembly includes a cylindrical C-shaped spring retainer member having a hollow open core with an exterior longitudinal slit aperture extending into the core. The spring retainer member is mounted on a stud member having an enlarged head at one end, a retaining head at the other end, and a longitudinal shaft that is dimensioned to be substantially enclosed by the spring retainer member. The stud member can be used for both the insertion and retraction of the cylindrical spring retainer member. The retainer member can be actively fastened to a hole, for example, to hold panels on a wall.

7 Claims, 2 Drawing Sheets

PANEL SNAP FASTENER ASSEMBLY

This is a continuation of prior application Ser. No. 08/422,351, filed on Apr. 14, 1995, for a PANEL SNAP FASTENER ASSEMBLY, now U.S. Pat. No. 5,613,818.

BACKGROUND OF THE INVENTION

1. Field of the Invention

The present invention is directed to a fastener assembly that permits the mounting of panels in the cargo bay of aircraft and, more particularly, a two-part fastener assembly that can be quickly mounted and demounted to release the panel.

2. Description of Related Art

The interior walls of cargo planes, for example, as used by the military, can be subject to wear, such as abrasions and scrapes, that can occur as the maximum amount of cargo is attempted to be loaded into the bay of the cargo hold. The cargo plane walls are typically formed of approximately 0.06 inch thick composite surface panels. There has been a desire to use sheets of a protective plastic having various thickness ranges, for example, 0.04 inches in thickness, which should be easily mounted and demounted from the spars and stringers of the cargo bay. The conventional approach to this installation, has been the use of titanium bolts that extend through both a protective cover panel and the interior wall panel of the cargo bay. A clip nut is mounted in appropriate spars and stringers to enable the bolt to be threaded into the nut assembly.

Since in large planes as many as 20,000 fastener assemblies are utilized to hold the panels/liners, a substantial issue of labor in installation and removal of the panels is created. As can be appreciated, a plane can be subject to vibrations and the protective panels and its fasteners should be securely fastened. Balanced against this operational requirement is the desirability to reduce the labor time in both installing and demounting of the panels.

The prior art is still seeking an optimum solution to these opposing requirements.

OBJECTS AND SUMMARY OF THE INVENTION

The present invention provides a snap fastener assembly consisting of a self-contained two-part structure. A stud member has an enlarged head at one end of a longitudinal shaft and a smaller retaining head at the other end. A substantially cylindrical C-shaped spring retainer member having a longitudinal hollow open end core with an exterior slit aperture extending into the core is mounted on the longitudinal shaft. The exterior surface of the spring retaining member has a first and a second annular tapering section that meet at a central enlarged portion of a greater diameter than the tapering sections. The enlarged head of the stud member can have an annular groove adjacent the base of the longitudinal shaft that is dimensioned to receive one end of the spring retaining member. The enlarged head and retainer head of the stud member prevent the spring retainer member from being released along the longitudinal axis whereby the spring retainer member can be compressed during insertion into an opening or bore and then can expand to provide a locking friction force for holding the protective cover to the bulkhead of a cargo bay.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a cargo panel fastener.

Figure 1:
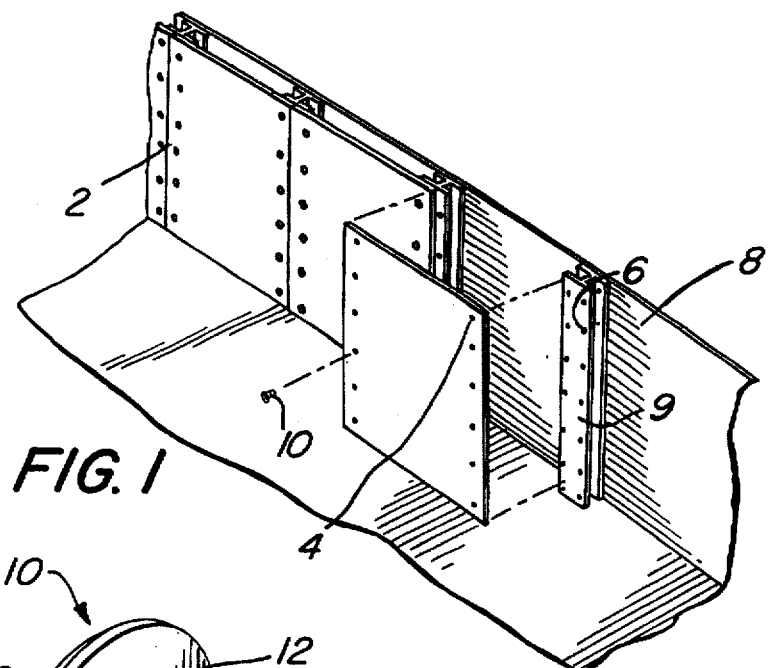
FIG. 1 is a perspective view disclosing protective covers mounted on the bulkhead of a cargo bay.

Referring to FIG. 1, a schematic partial perspective view of a cargo bay of a plane is disclosed wherein panels, for example, having a 0.04 inches thickness of plastic sheets are mounted onto the bulkhead 8 of a plane by the fastener assembly of the present invention. The panels 2 have appropriately positioned holes or bores 4, which are juxtapositioned to align with corresponding holes or bores 6 in the bulkhead flanges 9. The fastener assembly 10 of the present invention can be quickly mounted by a force application so that the insertion operation can be performed manually by laborers, either by hand or with hand tools.

Figure 2:
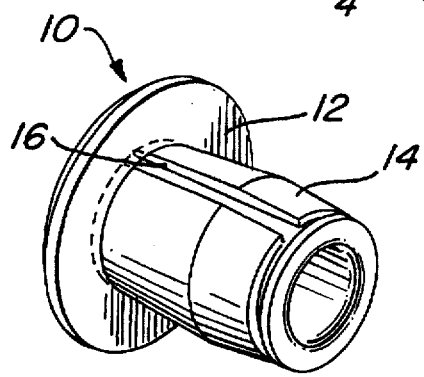
FIG. 2 is a perspective view of the fastener assembly of the present invention.
Figure 3:
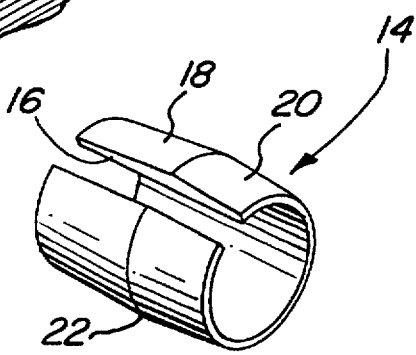
FIG. 3 is a perspective view of the spring retainer member of the present invention.

A perspective view of the fastener assembly 10 can be seen in FIG. 2. The fastener assembly 10 includes a stud member 12 and a spring retainer member 14. The spring retainer member, as seen in a perspective view in FIG. 3, can comprise a substantially cylindrical C-shaped metallic body, for example, made of stainless steel, such as a formable 430, having a longitudinal hollow open ended core section. An exterior slit aperture 16 extends the length of the retainer member 14 to thereby enable a compression movement of the spring retainer member 14 during insertion and extraction. The exterior surface has a first annular tapering section 18 and a second annular tapering section 20. The degree of taper can be 5° relative to a longitudinal axis through the core section. A central enlarged portion or rim 22 of a greater diameter than the tapering sections and positioned between the respective tapering sections is provided. By appropriate selection of the type of material and the heat treating procedure, the spring constant of the retainer member 14 can be adjusted to provide a particular insertion force. For example, a ⅛-inch fastener can be set to have an insertion force between 25 and 35 pounds in a hole diameter of about 0.31 inches with a 430 stainless steel.

Figure 4:
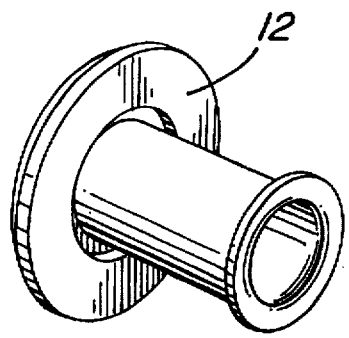
FIG. 4 is a perspective view of the stud member of the present invention.
Figure 5:
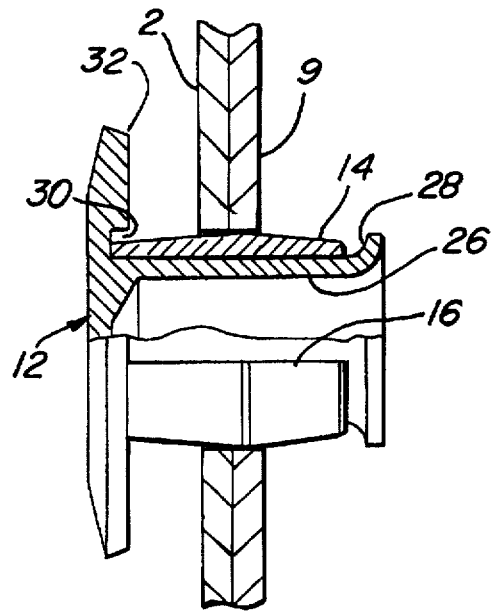
FIG. 5 is a cross-sectional view of the fastener assembly under compression as it is being mounted on the bulkhead skin of a cargo plane.

Referring to FIG. 4, a perspective view of the stud member 12 is disclosed. The stud member has an enlarged head 24 with a hollow longitudinal shaft 26 terminating in a retaining head or flange 28. An annular groove 30 is formed in the enlarged head 24 at its interface with the longitudinal shaft 26. As seen in FIG. 5, the stud member 12 can be machined from a unitary piece of metal, such as a 430 stainless steel. While not shown, an alternative embodiment of the present invention could have the longitudinal shaft 26 and retainer head 28 formed as one piece of material with the enlarged head 24 formed from another piece of material having a central opening. A portion of the longitudinal shaft could extend through the central opening to be cold-worked for an interconnection with the enlarged head. Other forms of manufacturing the stud member can be employed.

Again, referring to FIG. 5, the spring retainer member 14 is mounted on the longitudinal shaft 26 and the open-ended portion of the longitudinal shaft 26 could be cold-worked to form the retainer head 28 for locking the spring retainer member 14 to the fastener assembly. The provision of the annular groove 30 is dimensioned to assist in centering the spring retainer member 14 and to also assist in enabling a hand-operated retraction tool to be inserted beneath or between the enlarged head 24 and a panel 2 for a simplified extraction. The relative distance between the base of the groove 30 and the enlarged head 28 keep the spring retainer member 14 within the groove 30 and permit sufficient longitudinal movement while minimizing any rattling movement of the head relative to the spring retainer member 14. The enlarged head 24 also has a tapered edge 32 to further facilitate the insertion of a removal tool 34.

Figure 6:
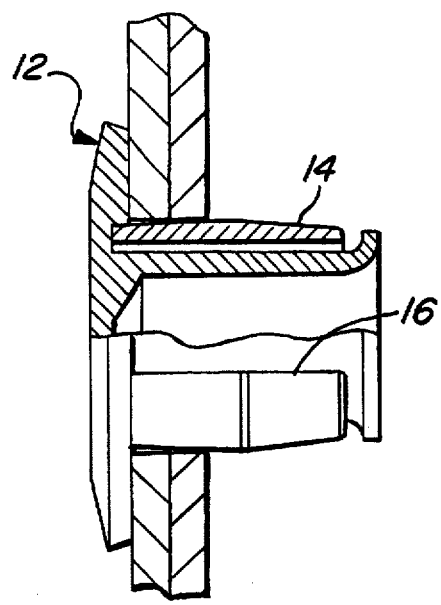
FIG. 6 is a cross-sectional view of the fastener assembly installed.

In FIG. 5, the spring retainer member 14 has been compressed as it is passing through a hole that is juxtapositioned between the panel 2 and the bulkhead wall or flange 9. The spring retainer member 14 is compressed during the insertion and then, as seen in FIG. 6, the spring retainer member can be somewhat released, although it is still in compression, due to the dimensioning of the hole 4.

Figure 7:
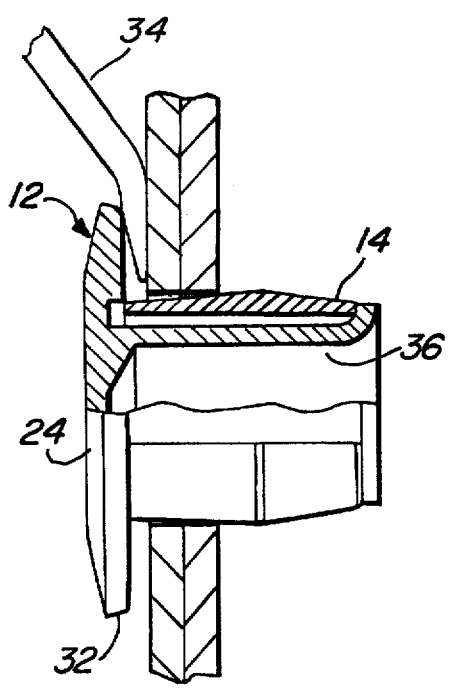
FIG. 7 is a schematic cross-sectional view of the fastener assembly being released with a hand tool.

Referring to FIG. 7, a removal tool 34 has been slid underneath the enlarged head 24 of the stud member 12 so that the fastener assembly can be pried from the panel 2. As can be readily appreciated, the stud member 12, in essence, is a carrier or insertion component of a fastening assembly with the exterior of the enlarged head 24 receiving the insertion force and the underside of the enlarged head 24 receiving an extraction force as a result of a lever pivoting motion by a removal tool 34. The spring retainer member 14 compresses in a direction perpendicular or traverse to the longitudinal axis of the fastener assembly and it is driven into place by the stud member 12 and then removed also by the stud member 12. The stud member 12 does not perform an active role after the retainer member has been installed, that is, the retainer member 14 is the locking member for holding the panel 2 in place.

Figure 8:
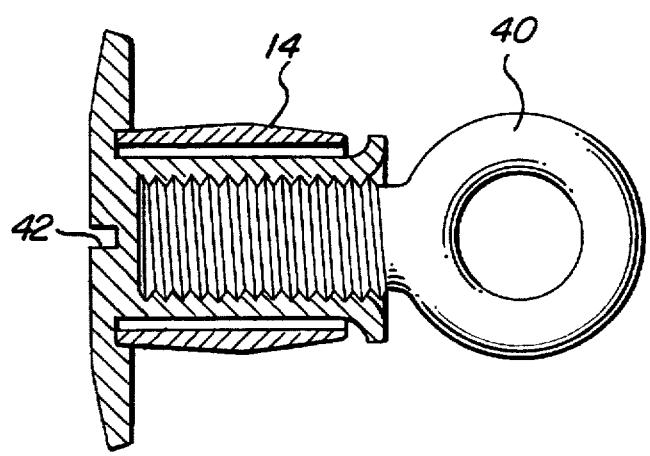
FIG. 8 is a cross-sectional view of an alternative embodiment of the invention, incorporating a threaded joint.

An alternative embodiment of the present invention is disclosed in FIG. 8, wherein the opening bore section 36 of the longitudinal shaft 26 can be further threaded so that it can receive a threaded bolt member 40. This embodiment of the invention would, in essence, provide an arrangement for inserting a nut through a panel so that it would receive a threaded bolt 40 from the other side of the panel to thereby provide a locking assembly. The enlarged head 24 has a slot 42 for receiving a screwdriver blade to prevent the modified stud member from turning when the bolt member 40 is inserted. As can be appreciated, any use of this embodiment of the invention would require access to both sides of the panel. As disclosed in the preferred embodiment, shown in FIG. 1, only one-sided access is required for assembly and extraction of the present fastening assembly with a minimum of labor.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for attaching and removing protective panels to side walls of an aircraft having bores of a predetermined dimension, comprising:

an apertured panel;

a removable two-part fastener extending through the apertured panel and providing a frictional fit with a bore in the side wall of the aircraft, the fastener including, a stud member having an enlarged head at one end, which is dimensioned to receive both an insertion force and an extraction force and to retain the apertured panel and a retaining head at the other end of a dimension to pass through the bore, the enlarged head and retaining head are interconnected by a longitudinal shaft that is smaller in circumference than an outer edge of the retaining head; and a spring retainer member, having a longitudinal hollow open-ended core with an exterior longitudinal slit aperture extending into the core, is permanently mounted on and substantially encloses the longitudinal shaft, the length of the spring retainer member is less than the length of the longitudinal shaft so that the spring retainer member can slide along the longitudinal shaft from the enlarged head to the retaining head during insertion and extraction of the fastener, an outer circumference portion of the spring retainer member is greater than an inner circumference of the bore, whereby the spring retainer member is compressed as an insertion force is applied to the enlarged head to thereby contact one end of the spring retainer member and force the spring retainer member into the bore, the spring retainer member is also compressed when an extraction force is applied to the enlarged head to thereby cause the retaining head to contact the other end of the spring retainer member and force the spring retainer member to be compressed as it is extracted from the bore, whereby the stud member enables the insertion and retraction of the fastener, while the spring retainer member provides the actual fastening force with the bore in the wall; and an extraction tool for engaging the enlarged head to pry the stud member away from a fastened position.

2. The system of claim 1, wherein the stud member has a hollow threaded opening.

3. The system of claim 1, wherein the enlarged head has a tapered edge extending inwardly towards the spring retainer member of a dimension to enable the extraction tool to pry the stud member away from a fastened position.

4. The system of claim 3, wherein the enlarged head has an annular groove extending around the longitudinal shaft and dimensioned to receive the spring retainer member.

5. The removable panel snap fastener assembly as claimed in claim 1 wherein the spring retainer member and stud member are formed of 430 stainless steel.

6. The invention of claim 1, wherein the spring retainer member has a substantially cylindrical outer surface with at least one annular tapering section and a central enlarged portion of a greater diameter than the tapering section, the only opening along the cylindrical outer surface is the longitudinal slit aperture.

7. The invention of claim 6, wherein the tapering section has a taper angle of approximately 5° relative to a longitudinal axis.

* * * * *